(12) United States Patent
Adelman

(10) Patent No.: US 11,761,473 B1
(45) Date of Patent: Sep. 19, 2023

(54) ANGLED GATE CARABINER

(71) Applicant: Nite Ize, Inc., Boulder, CO (US)

(72) Inventor: Gregory M. Adelman, Boulder, CO (US)

(73) Assignee: Nite Ize, Inc., Boulder, CO (US)

( * ) Notice: Subject to any disclaimer, the term of this patent is extended or adjusted under 35 U.S.C. 154(b) by 0 days.

(21) Appl. No.: 17/820,393

(22) Filed: Aug. 17, 2022

Related U.S. Application Data

(60) Provisional application No. 63/350,162, filed on Jun. 8, 2022.

(51) Int. Cl.
*F16B 45/00* (2006.01)
*A44B 15/00* (2006.01)
*F16B 45/02* (2006.01)

(52) U.S. Cl.
CPC .......... *F16B 45/037* (2021.05); *A44B 15/00* (2013.01)

(58) Field of Classification Search
CPC .............................. F16B 45/037; A44B 15/00
See application file for complete search history.

(56) References Cited

U.S. PATENT DOCUMENTS

| | | | | |
|---|---|---|---|---|
| D626,393 S | * | 11/2010 | Ormsbee | D8/18 |
| 9,255,602 B2 | * | 2/2016 | Liang | F16B 45/02 |
| 9,441,665 B2 | * | 9/2016 | Liang | F16B 45/06 |
| D775,513 S | * | 1/2017 | Kelleghan | D8/356 |
| D785,317 S | * | 5/2017 | Grossman | D8/356 |
| D934,663 S | * | 11/2021 | Adelman | F16B 45/023 |
| | | | | D8/356 |
| 2009/0000086 A1 | * | 1/2009 | Bing | F16B 45/06 |
| | | | | 24/592.11 |
| 2016/0047409 A1 | * | 2/2016 | Fitz-Earle | F16B 45/02 |
| | | | | 24/456 |
| 2022/0018384 A1 | * | 1/2022 | Adelman | A44B 15/00 |

* cited by examiner

*Primary Examiner* — David M Upchurch
(74) *Attorney, Agent, or Firm* — Potomac Law Group, PLLC

(57) ABSTRACT

Embodiments are directed to a carabiner that includes a carabiner body forming an opening and comprising a gate base, a gate rest, and a gate rest extension. In embodiments, at least one pivotable gate is coupled to the gate base at a pivotable point and adapted to contact the gate rest when in a closed position. In embodiments, the gate rest extension comprises a gate rest extension axis, and an angle between the gate rest extension and gate when in the closed position is approximately 35-61 degrees.

20 Claims, 14 Drawing Sheets

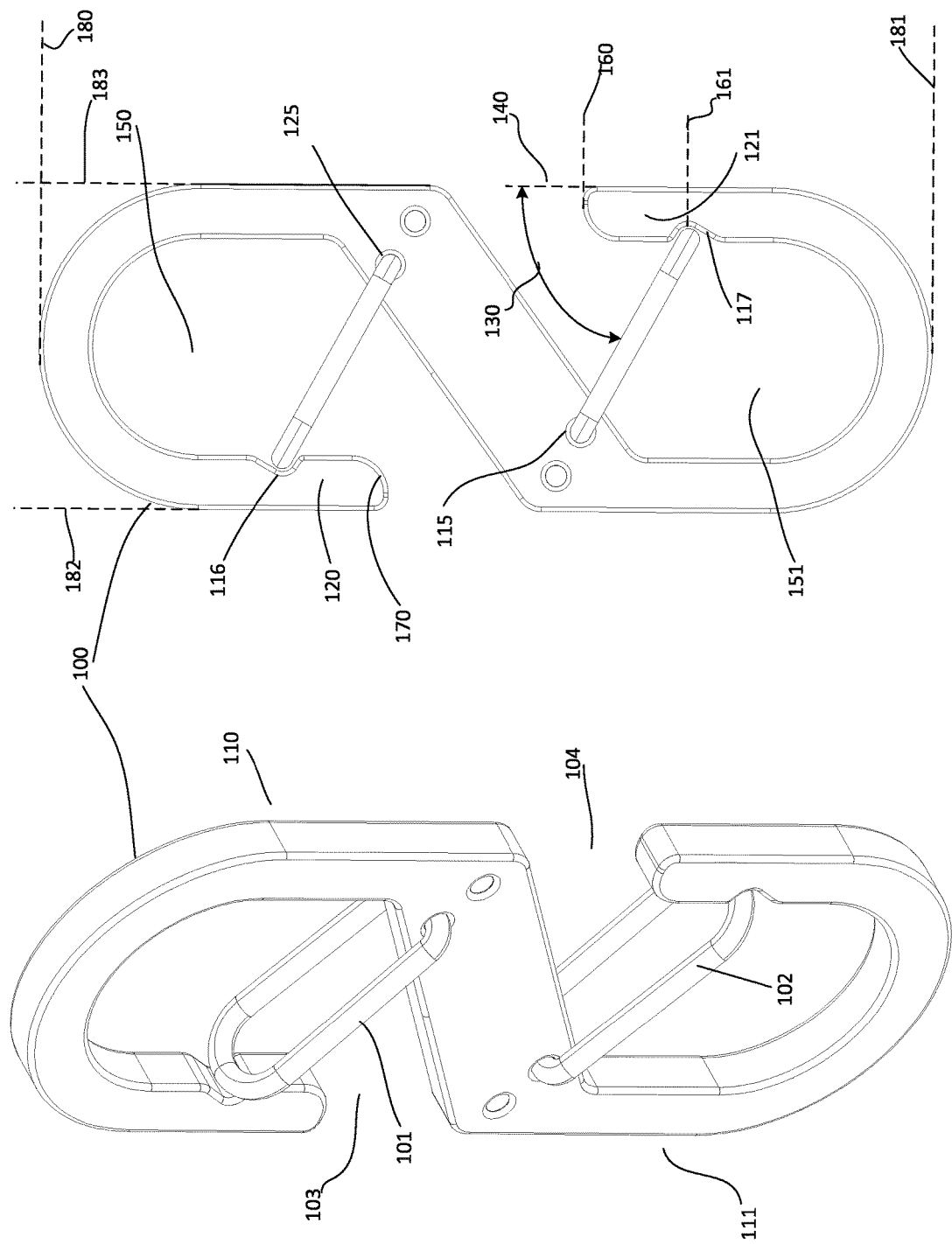

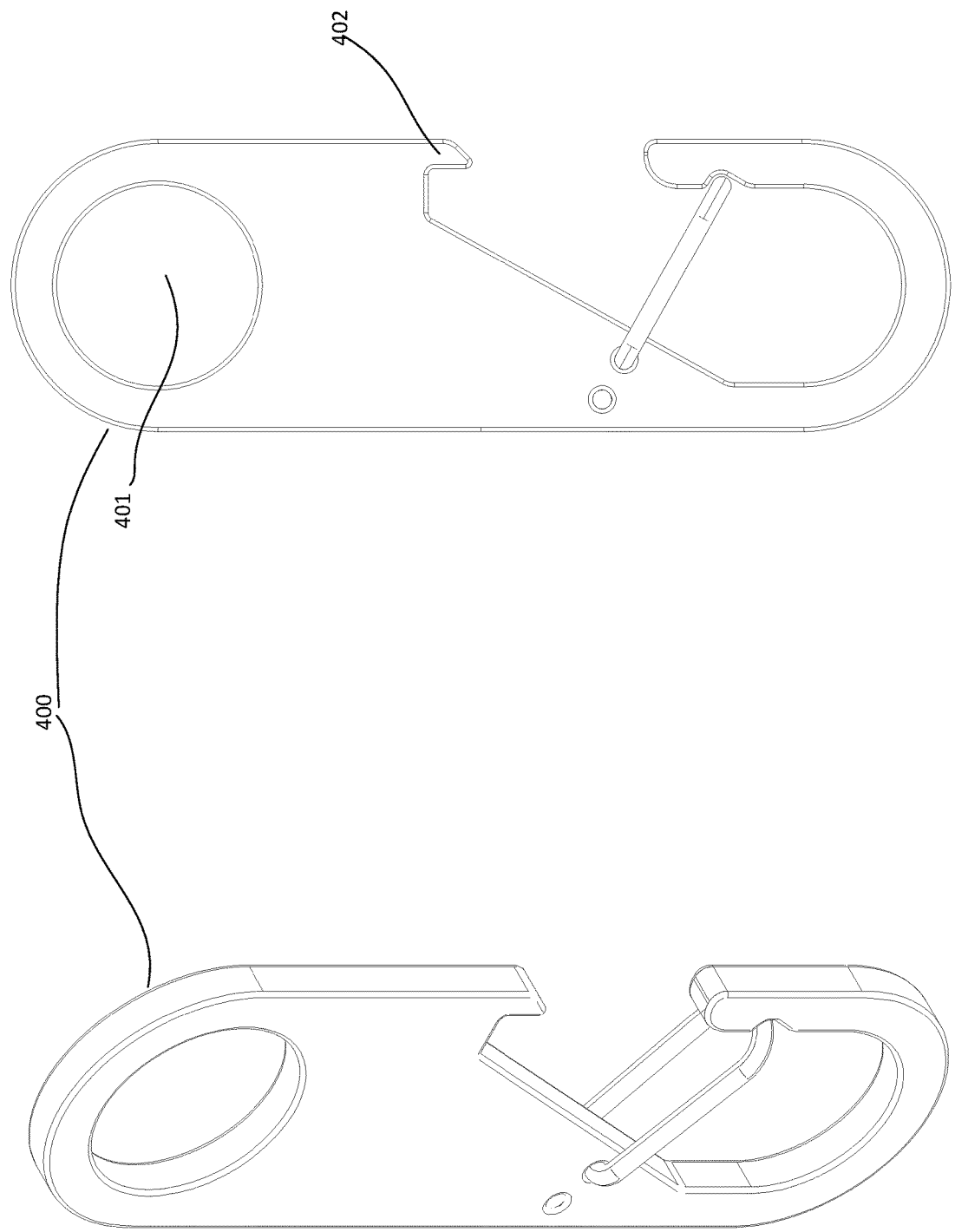

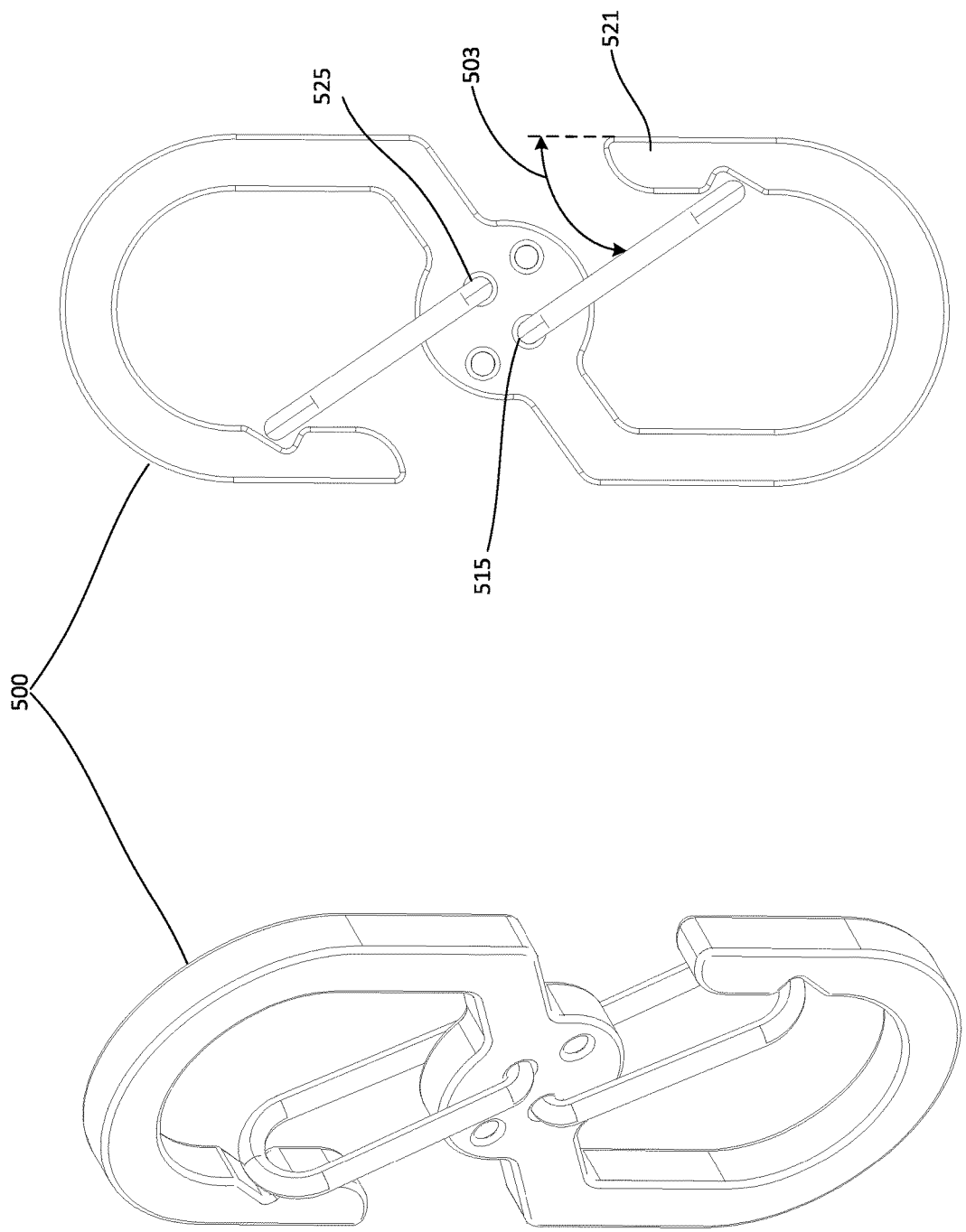

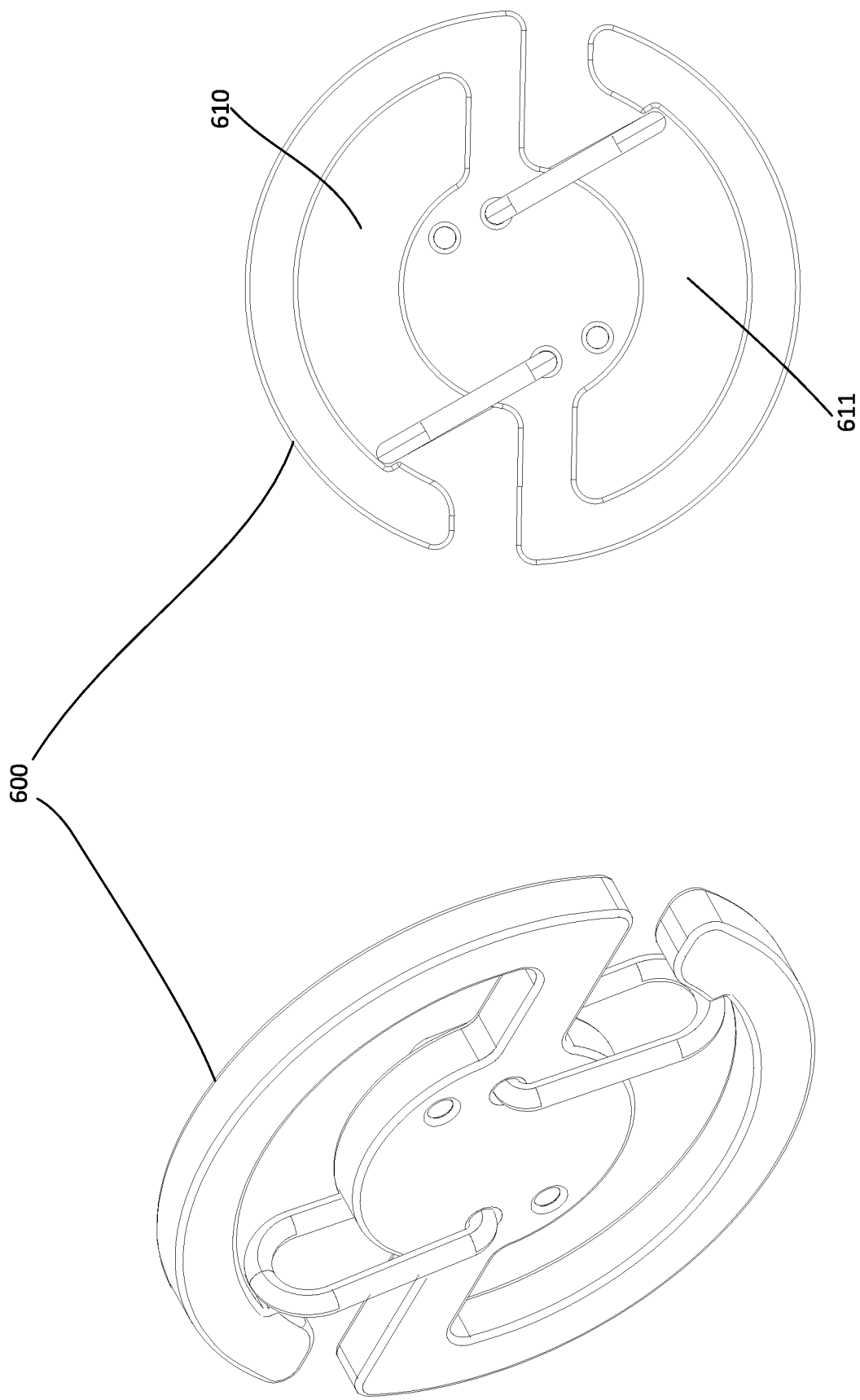

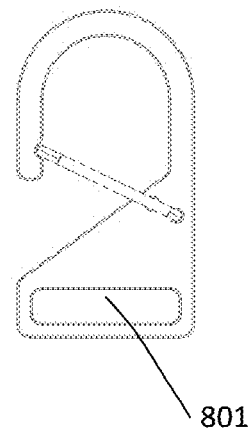
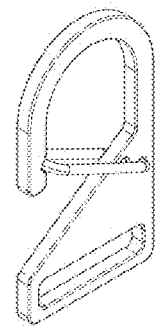
Fig. 8

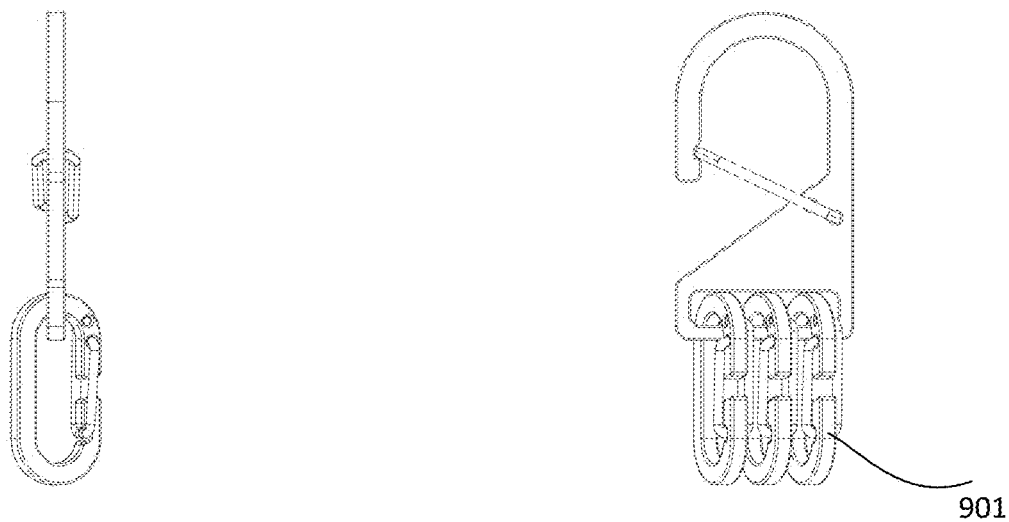
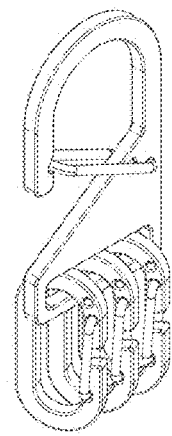
Fig. 9

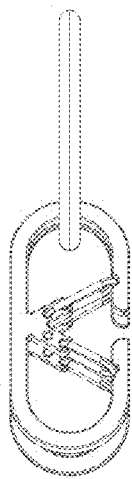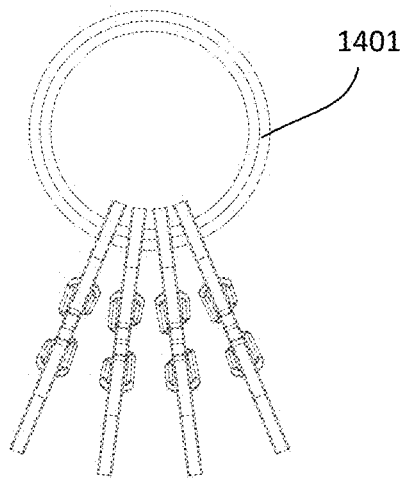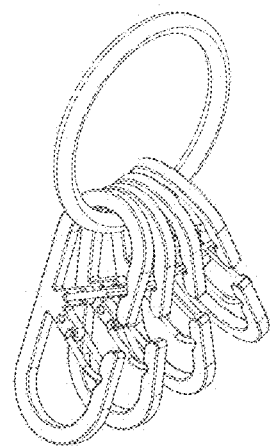
Fig. 14

ANGLED GATE CARABINER

CROSS REFERENCE TO RELATED APPLICATIONS

This application claims priority of U.S. Provisional Patent Application Ser. No. 63/350,162, filed on Jun. 8, 2022, the disclosure of which is hereby incorporated by reference.

FIELD

One embodiment is directed generally to a carabiner.

BACKGROUND INFORMATION

A carabiner is a specialized type of shackle generally implemented as a metal loop with a spring-loaded gate used to quickly and reversibly connect components, most notably in safety-critical systems. In various scenarios, carabiners are useful for hikers, fishermen, outdoorsmen, travelers, and a variety of other users. Carabiners may be used to tie objects down, connect one object to another, etc. In many scenarios, users utilize carabineers for holding keys or other items. However, the security of the keys or other objects on the carabiner is at issue, as well as the usability of the device.

SUMMARY

Embodiments are directed to a carabiner that includes a carabiner body forming an opening and comprising a gate base, a gate rest, and a gate rest extension. In embodiments, at least one pivotable gate is coupled to the gate base at a pivotable point and adapted to contact the gate rest when in a closed position. In embodiments, the gate rest extension comprises a gate rest extension axis, and an angle between the gate rest extension and gate when in the closed position is approximately 35-61 degrees.

BRIEF DESCRIPTION OF THE DRAWINGS

Further embodiments, details, advantages, and modifications will become apparent from the following detailed description of the embodiments, which is to be taken in conjunction with the accompanying drawings.

FIG. 1A is a perspective view and FIG. 1B is a side view of an angled gate carabiner in accordance to an embodiment.

FIG. 2A is a perspective view and FIG. 2B is a side view of an angled gate carabiner in accordance to an embodiment.

FIG. 4A is a perspective view and FIG. 4B is a side view of an angled gate carabiner in accordance to an embodiment.

FIG. 5A is a perspective view and FIG. 5B is a side view of an angled gate carabiner in accordance to an embodiment.

FIG. 6A is a perspective view and FIG. 6B is a side view of an angled gate carabiner in accordance to an embodiment.

FIG. 8 illustrates different views of the carabiner of FIGS. 3A and 3B as an embodiment with a rectangular slot eyelet in accordance to embodiments.

FIG. 9 illustrates different views of the carabiner of FIGS. 3A and 3B as an embodiment with a rectangular slot eyelet, with multiple other carabiners attached to the eyelet, in accordance to embodiments.

FIG. 14 illustrates different views of multiple carabiners of FIGS. 2A and 2B coupled to a split ring in accordance to embodiments.

DETAILED DESCRIPTION

Figure 2A:
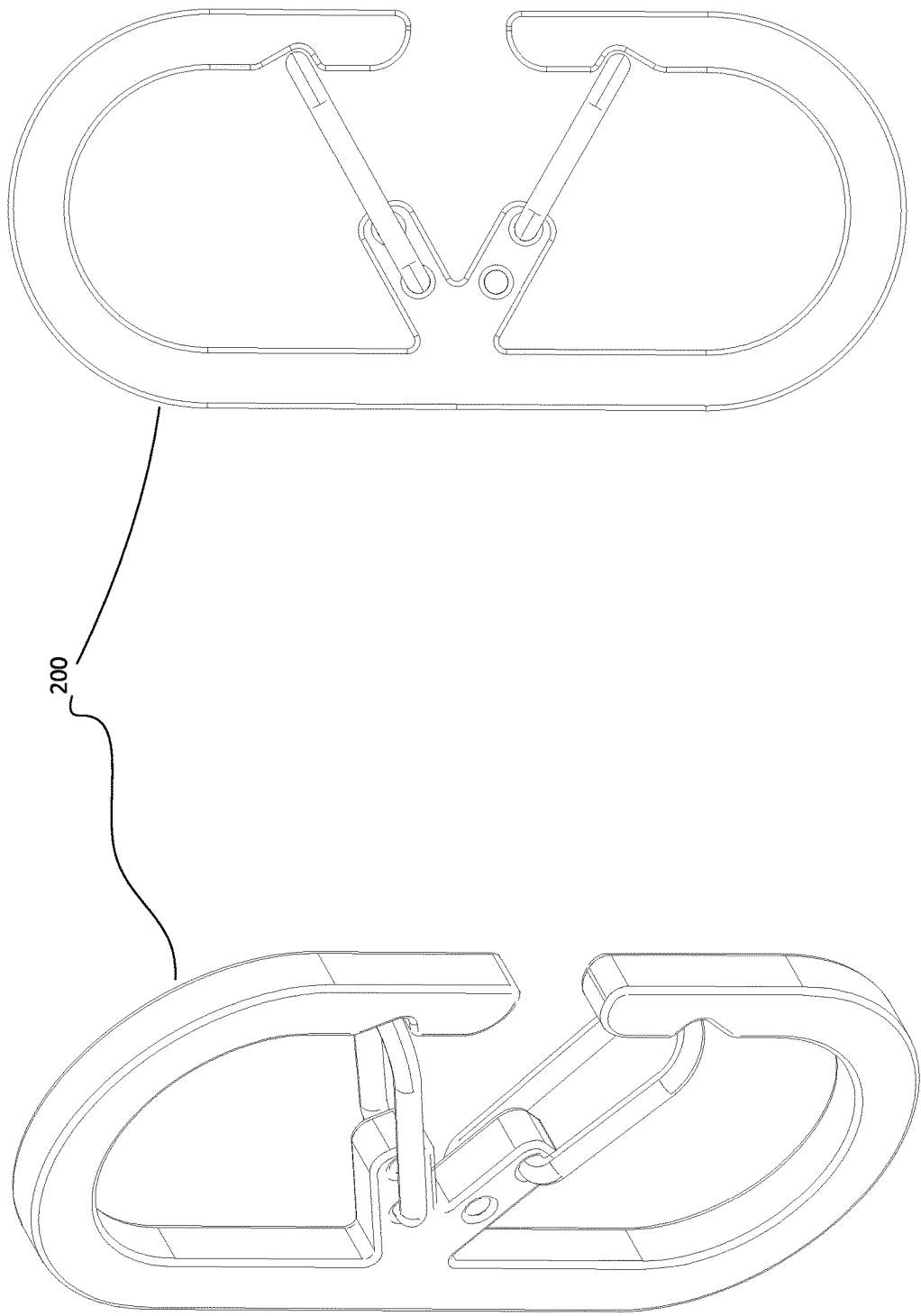

One embodiment is a carabiner with an angled gate or gates, each having a corresponding gate rest extension. Embodiments are adapted to hold keys, and the angled gate and gate rest extension, in addition to other features disclosed below, hold the keys in a secure manner.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures and components have not been described in detail so as not to unnecessarily obscure aspects of the embodiments. Wherever possible, like reference numbers will be used for like elements.

FIG. 1A is a perspective view and FIG. 1B is a side view of an angled gate carabiner 100 in accordance to an embodiment.

Carabiner 100 includes two spring loaded gates 101, 102 that gate two openings 103, 104. Carabiner 100 includes an upper portion 110 and a lower portion 111. Each portion 110, 111 forms a carabiner chamber 150, 151. The pivot point of each of gates 101, 102 are coupled to a gate base 125, 115 and the other side resting on a gate rest notch 116, 117 when not being flexed by a user. A gate rest extension 120, 121 (i.e., a gate rest of proportionally greater length than typical gate rests) extends from each gate rest notch 116, 117.

Embodiments of the invention, including carabiner 100 and other embodiments disclosed below, feature one or more angled gates and accept most keys, and similar objects, directly onto the carabiner body. The carabiner body includes a long edge/side/axis when upright in the vertical direction (i.e., in the upright direction as shown in FIG. 1), and a short edge/side/axis when upright in a horizontal direction. In embodiments of carabiner 100, the overall length in the vertical direction at the outside edges (between lines 180, 181) is approximately 1.97" and width in the horizontal direction at the outside edges (between lines 182, 183 is approximately 0.71". In embodiments, the cross section of the carabiner body is optimally sized to accept keys (i.e., small enough to fit through the typical hole/aperture of a typical key). In one embodiment, the cross section of carabiner 100, which is a rectangular shape, is approximately 0.094"×0.118".

Embodiments include novel features to assist in holding the keys securely once they are on the carabiner, and to allow for the keys to be put on and removed from the carabiner quickly and easily.

In order to place a key on carabiner 100, a user slides the key onto the carabiner body at a carabiner body opening 103, 104, which flexes the respective gate 101, 102 open and slides it past the flexing gate until the gate springs back into place. To remove the key, the user flexes open the gate and removes the key by sliding it off the carabiner body at the opening.

As disclosed, embodiments include one or more angled gates 101, 102. The angle of the gates in embodiments generally differs from known carabiners. A gate angle 130 of carabiner 100 is approximately 60 degrees. Gate angle 130 is measured from the angle of gate rest extension 121 (or the outside longer edge of the carabiner body), shown at 140, to gate 102. In embodiments, the range of the gate angle is approximately 35 to 61 degrees, which is in contrast to the approximately 0 to 15 degrees gate angle generally found in known carabiners. In general, with known carabiners, including known double gated carabiners (i.e., carabiners with two chambers, openings, gates, etc.), the gates are in line with, or approximately in line with, the carabiner openings or the outside longer edge (edge 140) of the carabiner body with the opening. In contrast, in embodiments, the gates are closer to perpendicular to the carabiner body openings (i.e., perpendicular is 90 degrees and embodiments are approximately 60 degrees).

In embodiments, gate angle 130 is achieved by positioning the connection of the gate to the gate base 115, 125 on the opposite side of the carabiner body than the side of the carabiner body opening. In general, gates on known carabiners pivot from a location that is on or near the same side as the opening in the carabiner body.

In combination with the gate angles, to prevent accidental removal of keys or other items with an aperture, embodiments include extended gate rest extensions 120, 121 which are the portion of the carabiner body that extends past the gate rest notch 116, 117 and towards the carabiner body opening. This extended portion is proportionally longer than generally found on known carabiners. In embodiments, the length of each gate rest extension, between lines 160 (at approximately the end of the gate rest extension) and 161 (at approximately the center of the gate rest notch), is approximately 0.186"-0.232" in the embodiments of FIG. 1, and FIGS. 2-5 below, and in the embodiment of FIG. 6 below, the length is approximately 0.142".

The length of the gate rest extension in embodiments is designed in proportion to the key hole aperture size (or the aperture size of similar objects the embodiments are intended to be used with and secured). If the aperture or key hole is round, the minimum required length of the gate rest extension in embodiments is approximately equal to the diameter of the aperture or key hole in embodiments. If the aperture or key hole is irregularly shaped, the minimum required length of the gate rest extension in embodiments is approximately equal to the largest inner dimension of the aperture or hole. For smaller embodiments, the gate rest extension can be slightly shorter such as approximately 90% of the aperture or key hole diameter or largest inner dimension. When this minimum length requirement is met, the key hole or aperture of a key that is inside the carabiner chamber cannot slip over the end of the gate rest extension when the key is positioned with one edge of its hole or aperture all the way up against the inside edge of the gate.

In embodiments of FIGS. 1-5, in general, the overall length in the vertical direction at the outside edges is approximately 1.25"-1.97" and width in the horizontal direction at the outside edges is approximately 0.59"-0.78".

In embodiments, the novel gate base locations 115, 125, which facilitates the increased gate angle, as well as the gate rest extension (and/or combined with the other features) allows the carabiner body to function as a secure chamber for keys, or as a "key trap." The term "carabiner chamber" refers to the region behind the gate that holds objects or attaches to other objects. For example the embodiment in FIG. 1 has two chambers, while the embodiment of FIG. 3, disclosed below, has one chamber because one of the carabiner chambers is replaced with an eyelet. Embodiments function as a "key trap" because once keys slide onto the carabiner past the gate they are trapped and generally cannot come off the carabiner without an intentional action to remove them.

Carabiner 100 further includes a larger radius 170 at the end of the gate rest extensions 120, 121 in comparison to known carabiners. In one embodiment, radius 170 is twice the size as is generally used in known carabiners and is approximately 0.8". The large radius 170 on the inner corner and edge of the gate rest extensions allows for the gate rest to be extended to meet the design requirements while increasing the effective openings in the carabiner body. The extension of the gate rest portion has the effect of reducing the gate opening. However, the gate rest extension is a critical part of the design which allows it to function securely. Therefore, the "large" radii 170 are added to the inner edge of the gate rests to effectively enlarge the gate opening while maintaining the security. The straight outer edge of the gate rest extension provides the added security in embodiments.

The combination of the above features, specifically the novel gate angles and gate rest extensions, function in a way to lock most keys onto the carabiner where there is no way to remove them or for them to accidently fall off without intentionally opening the gate and removing the keys.

In operation, embodiments generally prevent a key from exiting the carabiner, no matter which way it is wiggled, rotated, twisted, or otherwise moved, because it is blocked by the gate, the gate extension, and the carabiner body. In addition to the security function, another benefit of embodiments is, due to the design geometry, the keys do not apply significant stress forces to the gate that would cause it to open, twist, bend or break under force. Most of the forces are instead applied to the stronger carabiner body, and the forces that are applied to the gates are minimal and the gate is further supported by the carabiner body. The keys are mechanically locked and blocked from coming off by the gate and gate rest extension. This is in contrast with known carabiners and double carabiners that may be key optimized (i.e., have carabiner bodies thin enough to accept keys directly), where keys will often fall off with a simple twist when they are positioned, through normal use and random movements, near the carabiner opening.

The concept of embodiments can be further visualized by imagining if the gate rest extension was much longer than shown in embodiments. It is then more easy to understand that the only way for the key to get past the gate (because of its angle relative to the gate rest extension) is to intentionally open the gate. The hypothetical (extra-long) extended gate rest extension does not offer any way for the key to get past it by sliding the hole/aperture of the keys over the end of the gate rest. The only way for the key to exit is to open the gate. This forms the key trap feature of embodiments of the invention.

In embodiments, the gate rest extension is not extra-long and is made just long enough so that the end of the gate rest extension (at the gate opening) is completely out of reach from the aperture/hole in the keys it is designed to be used with and to secure. Therefore, from the point of view of the key, there is no ability to get past the gate and the gate rest extension. In these designs the gate rest extension is made long enough for full security and short enough to have a useful sized (large enough) opening in the carabiner body. The opening is further optimized and enlarged by the size of gate angle 130 on the gate rests.

Embodiments are considered "key optimized" because they have thinner/narrower cross-sectional dimensions of their carabiner bodies that allow them to accept most keys directly onto their carabiner body, or any object with a key sized aperture. In embodiments, a common aperture size of 0.235" in its longest dimension is considered when determining sizes/lengths. In contrast, known carabiners typically have cross-sectional dimensions that are too large to accept keys directly, and the user needs to place the keys on a keyring or split ring and then put the keyring on the carabiner. This key optimized feature allow the carabiners, in accordance to embodiments, to function directly as key rings as opposed to non-key optimized carabiners which cannot directly hold keys on their carabiner bodies.

FIG. 2A is a perspective view and FIG. 2B is a side view of an angled gate carabiner 200 in accordance to an embodiment. In contrast to carabiner 100, which includes openings in the carabiner body on opposite sides of the carabiner body, carabiner 200 has both openings on the same side. Otherwise, carabiner 200 includes the same features disclosed above in connection with carabiner 100. In embodiments of carabiner 200, the overall length in the vertical direction at the outside edges is approximately 1.75" and width in the horizontal direction at the outside edges is approximately 0.78".

Figures 3A, 3B:
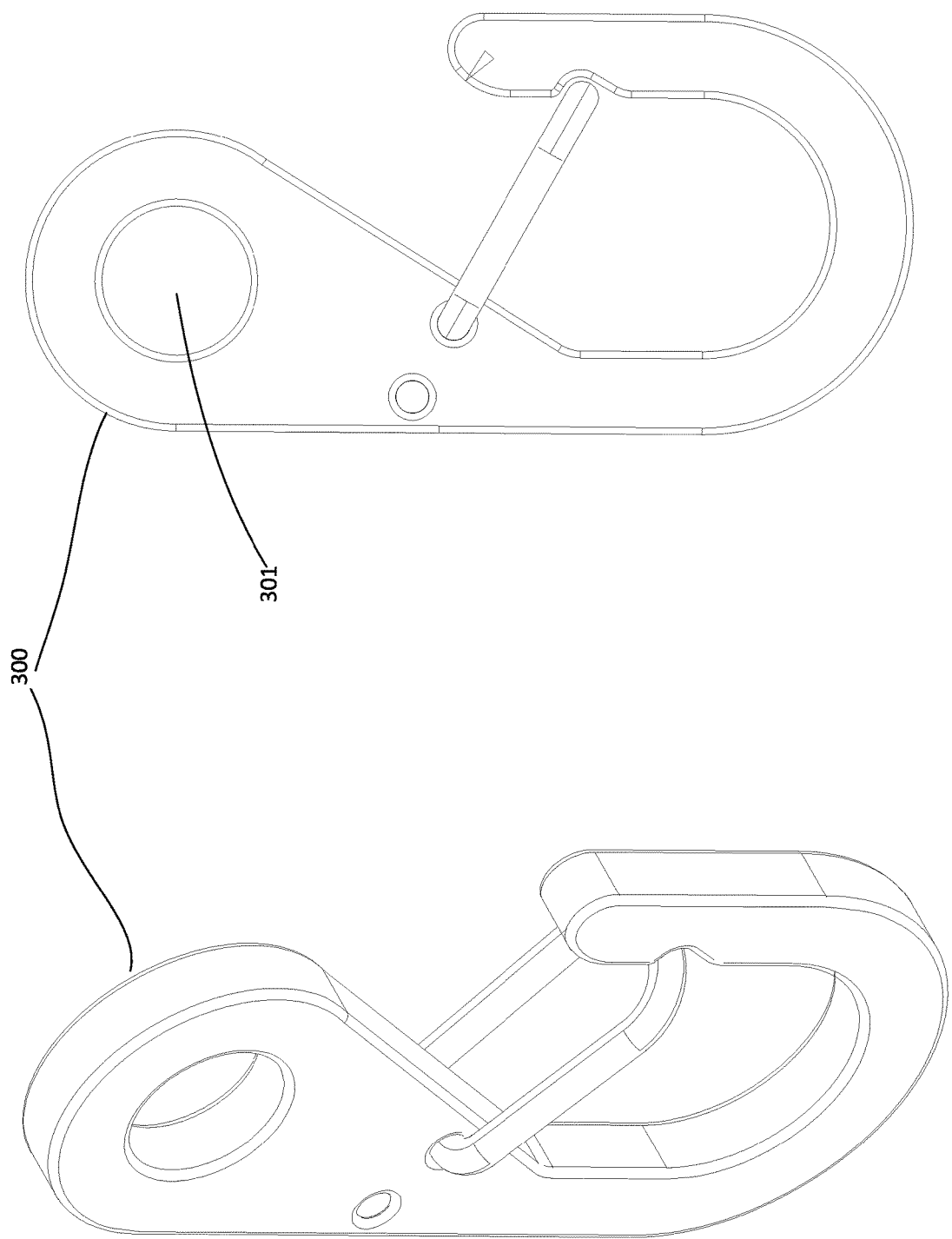
FIG. 3A is a perspective view and FIG. 3B is a side view of an angled gate carabiner in accordance to an embodiment.

FIG. 3A is a perspective view and FIG. 3B is a side view of an angled gate carabiner 300 in accordance to an embodiment. Carabiner 300 includes the same features disclosed above in connection with carabiner 100 but includes an eyelet 301 or aperture on one end instead of a second carabiner chamber. In embodiments of carabiner 300, the overall length in the vertical direction at the outside edges is approximately 1.25" and width in the horizontal direction at the outside edges is approximately 0.6".

Eyelet 301 can be used to place carabiner 300 onto a split ring, which will allow the user to insert and remove keys easily and securely without having to open the split ring, which can be difficult. Eyelet 301 can also be used to attach a cord to serve as a handle or fob for the key ring. The shape of eyelet 301, instead of being round, could be of varying shapes. For example, in an embodiment, eyelet 301 can be in the form of a slot, which allows, for example, a loop of strap or webbing to be attached to it to serve as a handle or fob for the key ring.

FIG. 4A is a perspective view and FIG. 4B is a side view of an angled gate carabiner 400 in accordance to an embodiment. Carabiner 400 takes advantage of the angle of the wire gate to allow for a bottle opener feature 402 to be added into the region of the gate opening. Bottle opener 402 can be used without the gate having to be opened. It also allows the user to use carabiner 400 as a more conventional bottle opener by lifting the back end in the upwards direction when lifting the bottle cap up. A large round aperture 401 on one end of carabiner 400 can accept a key ring and carabiners with or without keys to allow it to function as a key chain or key fob. Otherwise, carabiner 400 includes the same features disclosed above in connection with carabiner 100. In embodiments of carabiner 400, the overall length in the vertical direction at the outside edges is approximately 2.27" and width in the horizontal direction at the outside edges is approximately 0.7".

FIG. 5A is a perspective view and FIG. 5B is a side view of an angled gate carabiner 500 in accordance to an embodiment. Carabiner 500 generally differs from carabiner 100 of FIG. 1 and carabiner 200 of FIG. 2 based on the position of the gate base 515, 525, the gate angle 503, and the length of the gate rest extension 521. In embodiments of carabiner 500, the overall length in the vertical direction at the outside edges is approximately 1.73" and width in the horizontal direction at the outside edges is approximately 0.68".

Specifically, carabiner 500 has a reduced gate angle 503, in comparison with carabiners 100-400, of 35 degrees, and gate base 515, 525 is correspondingly closer to the center or midline of the carabiner body. As gate base 515, 525 moves away from the opening in the carabiner body, the angle of the gate is reduced. Carabiner 500 is still able to function in a similar secure manner as the other embodiments and demonstrates the range of gate angles and corresponding gate rest positions that can be used with embodiments while maintaining functionality. In embodiments, if the gate length is changed, the gate angle would also be changed in according to the geometry. In general, the gate length needs to be of sufficient length to swing properly and allow for a large enough opening in the carabiner body for the intended use.

The differences of carabiner 500 in comparison to other embodiments result in slightly larger carabiner chambers and a different aesthetic appearance while maintaining the other features and benefits, including ease of use and security.

FIG. 6A is a perspective view and FIG. 6B is a side view of an angled gate carabiner 600 in accordance to an embodiment. Carabiner 600 differs from embodiments of FIGS. 1, 2 and 5 primarily in the overall shape, and the shape and sizes of the two carabiner chambers. These differences result in a smaller carabiner with smaller chambers and a different aesthetic appearance, while maintaining the other features and benefits, including ease of use and security. The chambers 610, 611 on carabiner 600 are reduced in size and optimized to accept keys and other thin objects, such as belt loops in pants, straps and rings, and to reduce its overall size to make it easier to carry in a pocket. The chamber shapes are also specifically designed as a curved slot shape to keep the keys and other objects next to each other it an organized arrangement.

Figure 7:
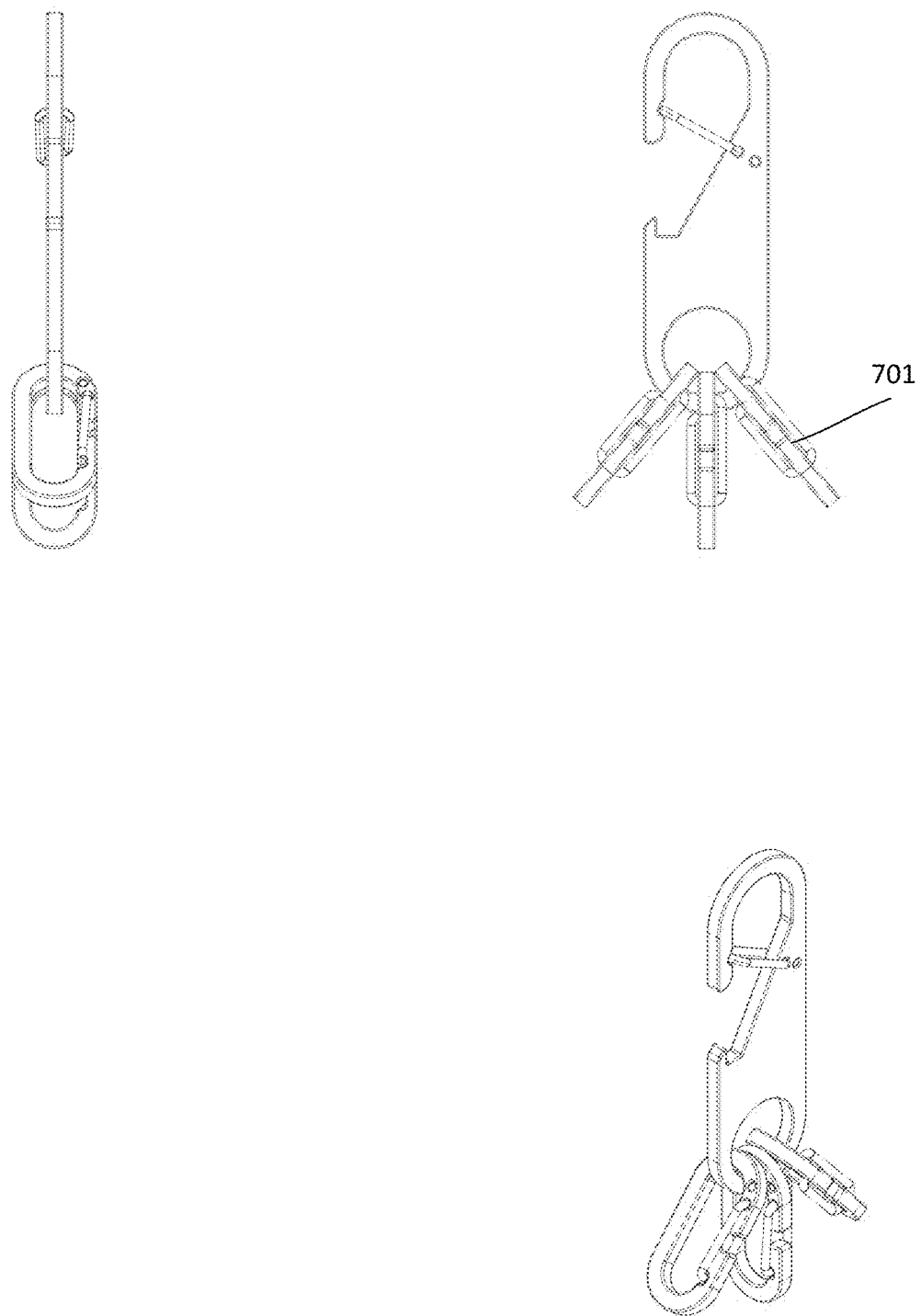
FIG. 7 illustrates different views of the carabiner of FIGS. 4A and 4B, with multiple other carabiners attached to the eyelet, in accordance to embodiments.

FIG. 7 illustrates different views of carabiner 400 of FIGS. 4A and 4B, with multiple other carabiners 701 attached to the eyelet, in accordance to embodiments.

FIG. 8 illustrates different views of carabiner 300 of FIGS. 3A and 3B as an embodiment with a rectangular slot eyelet 801 in accordance to embodiments.

FIG. 9 illustrates different views of carabiner 300 of FIGS. 3A and 38 as an embodiment with a rectangular slot eyelet, with multiple other carabiners 901 attached to the eyelet, in accordance to embodiments.

Figure 10:
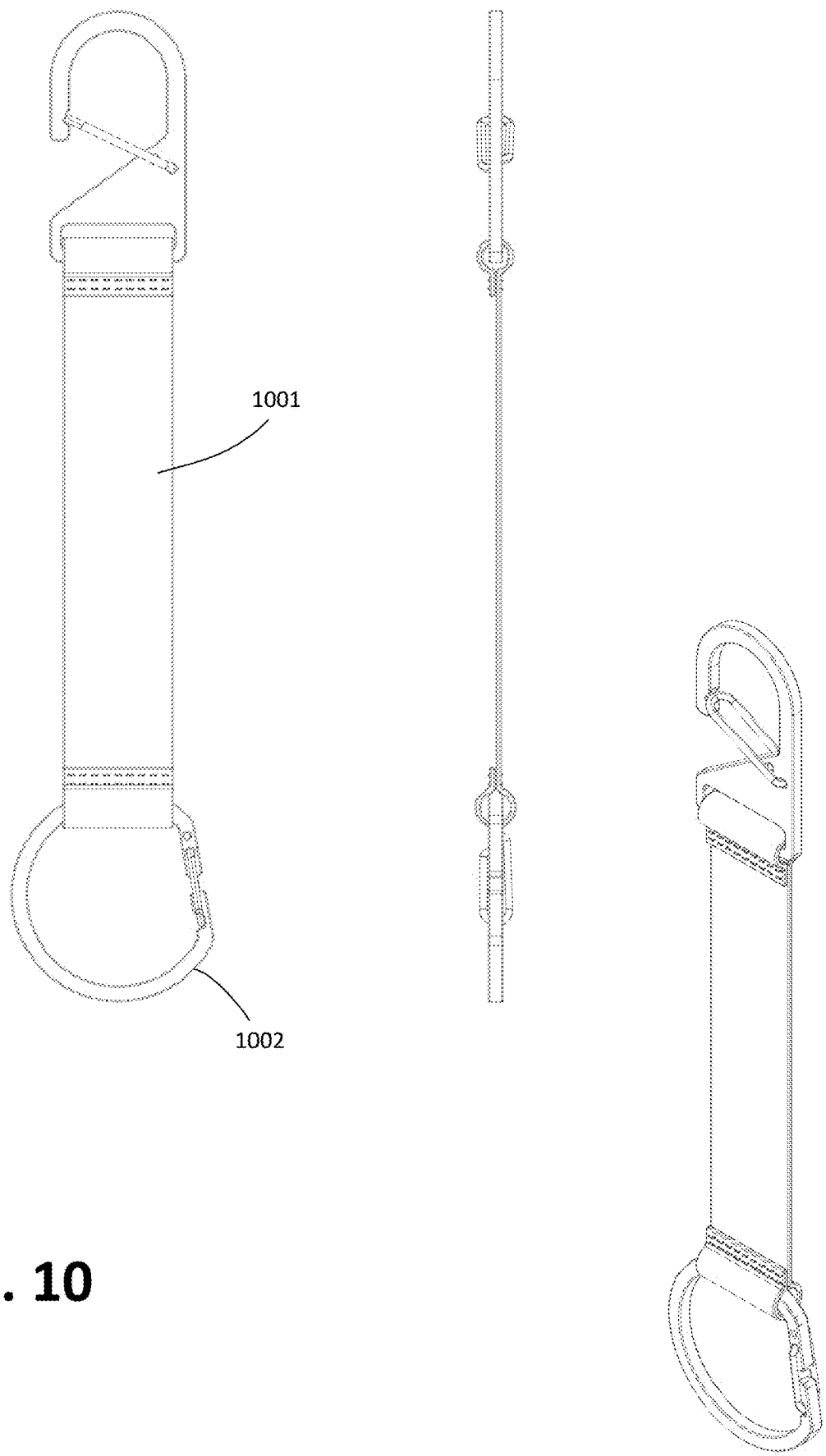
FIG. 10 illustrates different views of the carabiner of FIGS. 3A and 3B as an embodiment with a rectangular slot eyelet, with a fob/strap attached to the eyelet, and a circular carabiner in an open position attached to the fob, in accordance to embodiments.

FIG. 10 illustrates different views of carabiner 300 of FIGS. 3A and 3B as an embodiment with a rectangular slot eyelet, with a fob/strap 1001 attached to the eyelet, and a circular carabiner 1002 in an open position (i.e., the gate is exposed and accessible) attached to fob 1001, in accordance to embodiments.

Figure 11:
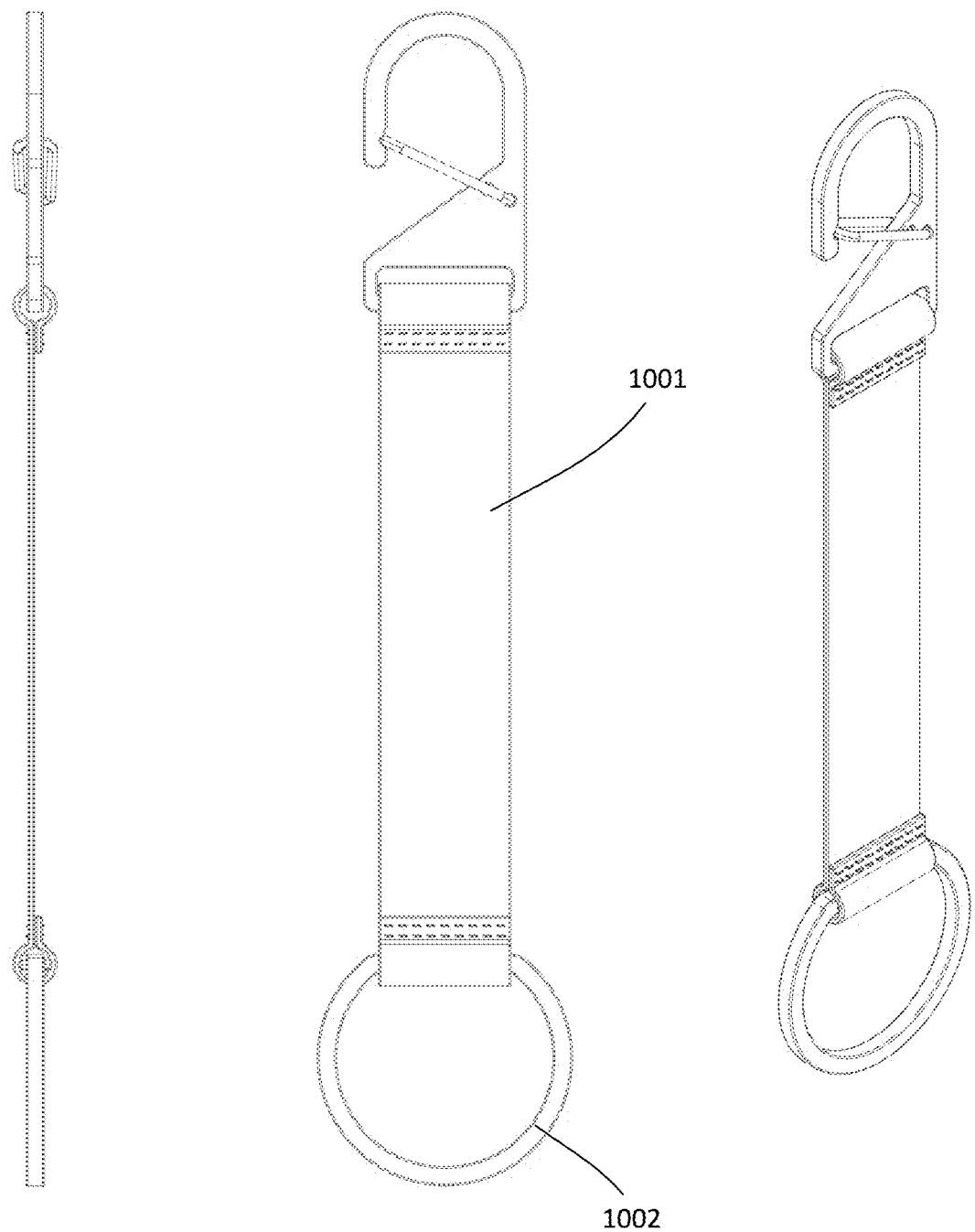
FIG. 11 illustrates different views of the carabiner of FIGS. 3A and 3B as an embodiment with a rectangular slot eyelet, with a fob/strap attached to the eyelet, and a circular carabiner in an closed position attached to the fob, in accordance to embodiments.

FIG. 11 illustrates different views of carabiner 300 of FIGS. 3A and 3B as an embodiment with a rectangular slot eyelet, with a fob/strap 1001 attached to the eyelet, and a circular carabiner 1002 in an closed position (i.e., rotated so that the gate is not exposed) attached to fob 1001, in accordance to embodiments.

Figure 12:
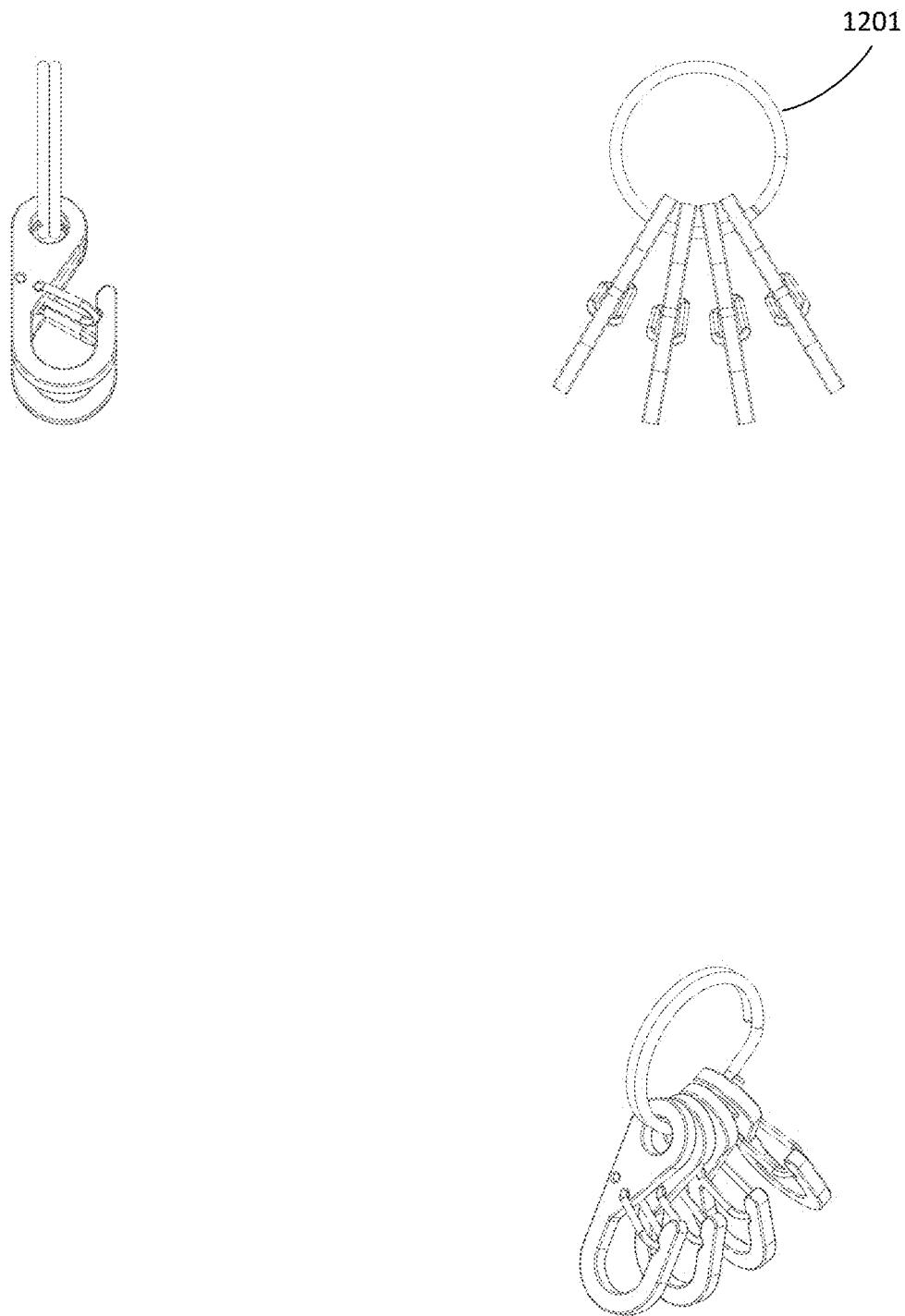
FIG. 12 illustrates different views of multiple carabiners of FIGS. 3A and 3B coupled to a split ring 1201 in accordance to embodiments.

FIG. 12 illustrates different views of multiple carabiners 300 of FIGS. 3A and 3B coupled to a split ring 1201 in accordance to embodiments.

Figure 13:
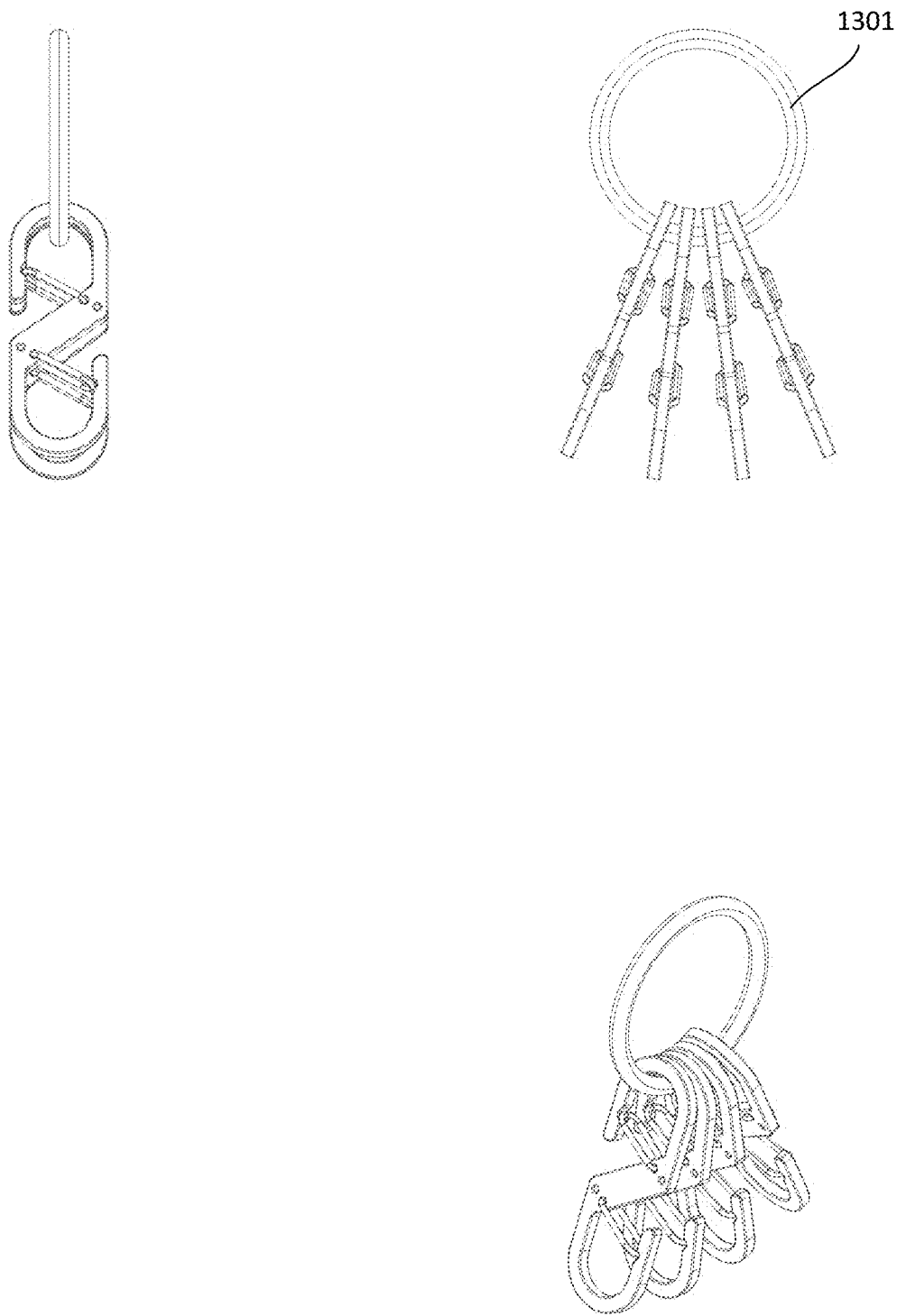
FIG. 13 illustrates different views of multiple carabiners of FIGS. 1A and 1B coupled to a split ring in accordance to embodiments.

FIG. 13 illustrates different views of multiple carabiners 100 of FIGS. 1A and 1B coupled to a split ring 1301 in accordance to embodiments.

FIG. 14 illustrates different views of multiple carabiners 200 of FIGS. 2A and 2B coupled to a split ring 1401 in accordance to embodiments.

In embodiments, the gates are implemented using spring wire. However, in other embodiments, they can be of another design and material as long as they function in a similar manner (i.e., swing open when force is applied and close on their own with spring force or by other means when opening force is removed). Further, the cross-sectional dimensions and shape of the carabiner body in embodiments can be any shape as long as it is small enough to accept keys or the objects they are intended to be used with that can be fit directly onto the carabiner body.

As disclosed, embodiments include changes to the inherent design of prior art carabiners, in general, so that they are naturally and inherently secure when used in everyday use, as opposed to adding specific locking features (e.g., slide locks) onto the carabiner that the user has to intentionally operate or take a specific action to lock or unlock with each use. The advantage of embodiments over carabiners with locking features is that they generally are secure all the time. With a locking carabiner, if the user forgets to lock it with each use, or the lock is bumped and opens on its own accidently, it stops being secure and serving its intended use. Embodiments are also easier and more pleasing to use because they do not require an extra step to achieve the enhanced security or require an additional step to unlock them before being able to open them.

The novel angles of the gates combined with and on their own without the extended gate rests provide extra security when these carabiner are attached to other objects beside keys, such as belt loops, rope/cord, chains, loops, rings, carabiners and similar objects. The angle of the gate eliminates a number of the ways that these objects could inadvertently fall off of common carabiners such as by twisting and slipping past the end of the gates, and it is more difficult for the gates to bend to the side and open accidently. This resistance to bending is partially because these designs require a shorter gate which is inherently more stable and less prone to twist or bend than longer gates in prior art carabiners. With the increased and novel gate angle it is more difficult for these various objects to work their way under the gates and disengage from the carabiners. The gate rest notch also contributes to the stability and security of this novel design by interfacing with the end of the gate and stabilizing it from twisting or bending to the side. The lateral movement is impeded by the body of the carabiner in the gate rest notch region due to the angle of the interface of the two parts (whether or not there is no actual notch or a deeper notch). In comparison to known carabiners, the end of the gate that interfaces with the carabiner body when in the closed position leans against the body and is more free to rotate laterally and twist or bend.

Embodiments provide an improvement over known carabiners for general use even if it only uses the novel gate angle feature (without the extended gate rest or key optimization). This is because the novel gate angle makes the carabiner more secure than a prior art carabiner in various ways discussed above.

The extended gate rest, in addition to the primary function it serves for security, as disclosed above, reduces the opening in the carabiner body which also improves its overall security for other objects besides keys, such as belt loops, key rings, straps, ropes, etc., by making it more difficult for objects to fall off it accidentally. With the extended gate rest, it is more difficult for these various objects to work their way under the gates and disengage from the carabiners.

Further, the "large" radius at the end of the gate rest extensions allows embodiments to be used with a larger range of objects and keys of varying sizes while maintaining to the high levels of security disclosed above. As disclosed above, it is the outer edges of the gate rest extensions that provide, in part, the enhanced security and general functionality. As long as gate rest extensions have enough material to be strong enough, as the parts in the figures, there is an advantage to increase the inner large radius to increase the clearance for putting objects on and off of the novel carabiners. The large inner radius is one way to remove the material that is not needed and to increase the effective opening of the carabiner body. The material could also be removed in various other manners such as with a straight or contoured line.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

What is claimed is:

1. A carabiner comprising:
a carabiner body forming an opening and comprising a gate base, a gate rest, and a gate rest extension;
a pivotable gate coupled to the gate base at a pivotable point and adapted to contact the gate rest when in a closed position;
wherein the gate rest extension comprises a gate rest extension axis, and an angle between the gate rest extension and gate when in the closed position is approximately 35-61 degrees.

2. The carabiner of claim 1, the carabiner body comprising a long edge and a short edge, axis, wherein the gate rest extension axis is along the long edge.

3. The carabiner of claim 1, wherein the pivotable gate contacts the gate rest at a gate rest notch.

4. The carabiner of claim 3, wherein the carabiner body has a size adapted to accommodate an aperture of an object, the aperture having an inner diameter, and a length of the gate rest extension extending past the gate rest notch is approximately equal to the inner diameter.

5. The carabiner of claim 4, wherein the object is a key.

6. The carabiner of claim 4, wherein a length of the gate rest extension, which extends past the gate rest notch, is approximately 0.186"-0.232".

7. The carabiner of claim 6, wherein an overall length in a vertical direction at outside edges is approximately 1.25"-1.97" and an overall length in a horizontal direction at the outside edges is approximately 0.59"-0.78".

8. The carabiner of claim 4, wherein a cross section of the carabiner body is approximately 0.094"×0.118".

9. The carabiner of claim 1, further comprising:
two openings, two gate rests, two gate rest extensions and two gate rest extensions.

10. The carabiner of claim 1, further comprising an eyelet.

11. The carabiner of claim 1, further comprising a bottle opener.

12. A method of coupling an object to a carabiner comprising:
providing the carabiner, the carabiner comprising a carabiner body forming an opening and a chamber, and comprising a gate base, a gate rest, and a gate rest extension, a pivotable gate coupled to the gate base at a pivotable point and adapted to contact the gate rest when in a closed position, and wherein the gate rest extension comprises a gate rest extension axis, and an angle between the gate rest extension and gate when in the closed position is approximately 35-61 degrees;
placing the gate rest extension through the object via an aperture on the object, the aperture having an inner diameter, and a length of the gate rest extension is approximately equal to the inner diameter; and
sliding the object into the chamber by pivoting the gate to an open position.

13. The method of claim 12, wherein the pivotable gate contacts the gate rest at a gate rest notch.

14. The method of claim 12, wherein the object is a key.

15. The method of claim 13, wherein a length of the gate rest extension, which extends past the gate rest notch, is approximately 0.186"-0.232".

16. The method of claim 15, wherein an overall length in a vertical direction at the outside edges is approximately 1.25"-1.97" and an overall length in a horizontal direction at the outside edges is approximately 0.59"-0.78".

17. The method of claim 12, wherein a cross section of the carabiner body is approximately 0.094"×0.118".

18. The method of claim 12, the carabiner further comprising:
two openings, two gate rests, two gate rest extensions and two gate rest extensions.

19. The method of claim 12, the carabiner further comprising an eyelet.

20. The method of claim 12, the carabiner further comprising a bottle opener.

* * * * *